US007890808B2

(12) United States Patent
Branca et al.

(10) Patent No.: US 7,890,808 B2

(45) Date of Patent: Feb. 15, 2011

(54) TESTING SOFTWARE APPLICATIONS BASED ON MULTIPLE DATA SOURCES

(75) Inventors: Salvatore Branca, Rome (IT); Angela Molinari, Rome (IT); Edoardo Turano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/955,454

(22) Filed: Dec. 13, 2007

(65) Prior Publication Data

US 2008/0155343 A1 Jun. 26, 2008

(30) Foreign Application Priority Data

Dec. 18, 2006 (EP) .................................. 06126336

(51) Int. Cl.
*G06F 11/00* (2006.01)

(52) U.S. Cl. ......................... 714/38; 702/121; 702/123; 714/25; 714/37; 717/124; 717/126; 717/127

(58) Field of Classification Search ................. 702/121, 702/123; 714/25, 37, 38, 736; 717/124, 717/123, 127
See application file for complete search history.

(56) References Cited

U.S. PATENT DOCUMENTS 5,438,673 A * 8/1995 Court et al. ................... 703/22
5,615,335 A * 3/1997 Onffroy et al. ................ 714/30
5,726,913 A * 3/1998 Grimsrud .................... 702/186
5,754,860 A 5/1998 McKeeman et al.
5,995,915 A * 11/1999 Reed et al. .................. 702/119
6,587,969 B1 * 7/2003 Weinberg et al. ............. 714/46
6,889,158 B2 * 5/2005 Penov et al. ................ 702/119
6,966,013 B2 * 11/2005 Blum et al. ................... 714/38
7,139,676 B2 * 11/2006 Barford ...................... 702/183

(Continued)

FOREIGN PATENT DOCUMENTS

WO WO 03/096191 A2 11/2003

OTHER PUBLICATIONS

Demillo, R. A. et al., "An Extended Overview of the Mothra Software Testing Environment", IEEE, Proceedings of the Second Workshop, Jul. 1988, pp. 142-151.

(Continued)

*Primary Examiner*—Robert Beausoliel
*Assistant Examiner*—Joshua P Lottich
(74) *Attorney, Agent, or Firm*—Stephen J. Walder, Jr.; Jeffrey S. LaBaw

(57) ABSTRACT

A solution is proposed for testing a software application. The test includes the execution of a series of test cases, each one involving the application of a predefined test input to the software application. The software application generates a corresponding output in response to this test input. A result of the test case is determined by comparing the actual output provided by the software application with an expected output thereof. The expected output of the test case is determined automatically. For this purpose, multiple auxiliary sources are exploited, such as other software applications different from the one under test. Each auxiliary source receives a corresponding input, derived from the test input, which is intended to cause the auxiliary source to provide the same expected output as the software application. The expected output is then estimated according to the actual outputs provided by the different auxiliary sources.

20 Claims, 7 Drawing Sheets

U.S. PATENT DOCUMENTS 7,260,503 B2 * 8/2007 Stobie et al. ................ 702/183
7,444,547 B2 * 10/2008 Abou-Emara et al. ......... 714/38
7,606,695 B1 * 10/2009 Nouri et al. ................... 703/22
2004/0103396 A1 * 5/2004 Nehab ........................ 717/127
2005/0071818 A1 * 3/2005 Reissman et al. ........... 717/127
2006/0075303 A1 * 4/2006 Ulrich et al. .................. 714/38
2006/0168475 A1 * 7/2006 Segers et al. .................. 714/25
2007/0038898 A1 * 2/2007 Clee et al. ..................... 714/38
2007/0101196 A1 * 5/2007 Rogers et al. ................. 714/38
2008/0082285 A1 * 4/2008 Samaan et al. .............. 702/118
2008/0086660 A1 * 4/2008 Wefers ........................ 714/37

OTHER PUBLICATIONS

International Search Report and Written Opinion dated Jun. 24, 2008 for International Application No. PCT/EP2007/059571, 10 pages.

* cited by examiner

300
Test cases
315
Test generator
310
A1.Generate
Bucket
320
Automation tool
325
A2.Exec
Software application
305
A3.Register
Evaluator
330
A10.Compare
Results
350
A4.Submit
A4.Submit
Adapter
Adapter
335
335
A5.Convert
A5.Convert
A6.Apply
A6.Apply
Auxiliary application
Auxiliary application
340
340
A7.Collect
Comparison engine
345
A8.Retrieve
Weights
347
A9.Estimate

TESTING SOFTWARE APPLICATIONS BASED ON MULTIPLE DATA SOURCES

FIELD OF THE INVENTION

The present invention relates to the test field. Particularly, the invention relates to the test of systems (such as software applications).

BACKGROUND ART

The test of generic systems (and especially software applications) is a very important activity in their development process. The test is basically aimed at verifying whether each software application behaves as expected; this is of the utmost importance for validating the correctness, completeness and quality of the software application.

The test generally includes a series of test cases (for one or more test scenarios relating to specific operations of the software application). The execution of each test case involves the use of a predefined input for the software application; the software application generates a corresponding output in response to this input. A result of the test case is determined by comparing the actual output provided by the software application with an expected output thereof being deemed correct (with the test case that is set to "passed" when the two values match and it set to "failed" otherwise).

A problem of the tests is the identification of the expected outputs of the different test cases. Sometimes, the expected outputs may be set directly by a tester according to the logic of the software application. In more complex situations, instead, it is not possible to establish the expected outputs a priori (such as when they depend on unknown environmental conditions); a typical example is that of an asset management application that must discover the hardware configuration of a large group of machines. Therefore, the expected output of each test case is generally assumed to be equal to the actual output of a previous execution of the same test case; in these situations as well, however, the expected outputs must be somehow validated by the tester.

Anyway, the tester needs to participate in the definition of the test cases. This is a very critical task, which must be performed substantially in a manual way by the tester. Particularly, the direct identification of each expected output requires the tester to enter its value (for example, by means of a text editor); on the other hand, the identification of each expected output based on the previous execution of the corresponding test case requires the tester to verify whether this value is actually correct. Therefore, the design of any test involves a heavy human intervention; moreover a deep investigation activity is necessary (especially when the tester must validate the expected outputs based on the previous executions of the test cases).

The problem is particular acute in large software applications, all the more when they must be tested with a high level of accuracy. Moreover, the same drawbacks are magnified in very dynamic environments; indeed, in this case the same operations must be repeated at any new version, release or service level of the software applications.

In any case, the work required to design the tests is very time consuming. Moreover, the obtained results are not repeatable and prone to errors (being strongly dependent on the skill of the tester).

All of the above adversely affects the cost and the quality of the tests; this hinders their extensive application, with a negative repercussion on the reliability of the software applications.

SUMMARY OF THE INVENTION

In its general terms, the present invention is based on the idea of exploiting auxiliary sources of information. Particularly, illustrative embodiments of the present invention provide a solution as set out in the independent claims. Advantageous embodiments of the invention are described in the dependent claims.

More specifically, an aspect of the invention provides a method for testing a system. In one illustrative embodiment, the method starts by applying a test input to the system; the test input is intended to cause the system to provide an expected response. A test response of the system is detected; the test response consists of an actual response of the system to the test input. The method continues by determining a result of the test, according to a comparison between the test response and the expected response. The method further includes the step of applying a corresponding auxiliary input—derived from the test input—to each one of a plurality of auxiliary sources; the auxiliary input is intended to cause the auxiliary source to provide the expected response. An auxiliary response of each auxiliary source is detected; the auxiliary response consists of an actual response of the auxiliary source to the corresponding auxiliary input. The expected response is then estimated according to the auxiliary responses.

Another aspect of the invention proposes a computer program for performing the above-described method. A different aspect of the invention proposes a corresponding system. Yet another aspect of the invention provides an apparatus comprising a processor and a memory coupled to the processor, the memory having instructions, which when executed by the processor, cause the processor to implement the method described above.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
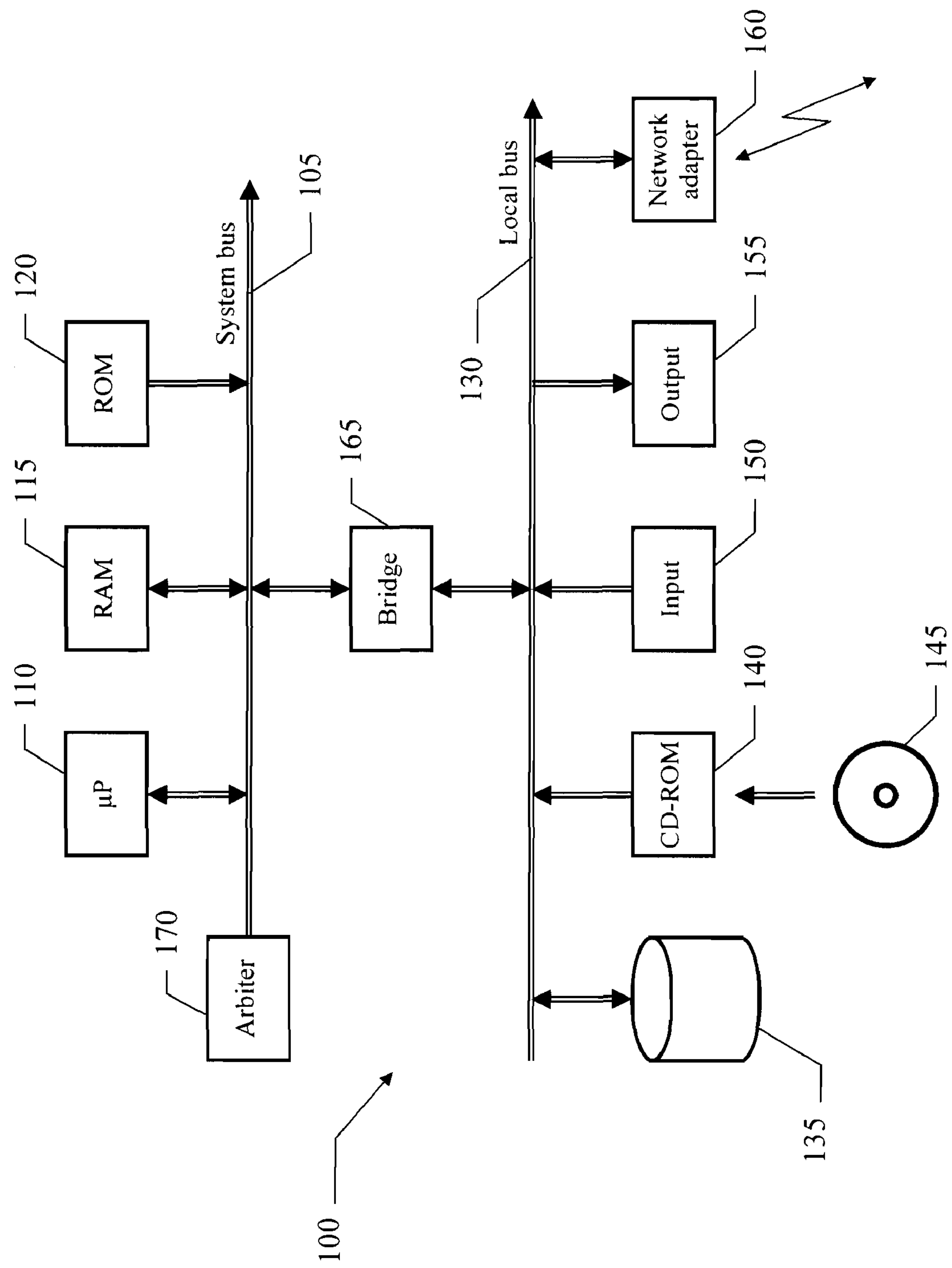
FIG. 1 is a schematic block diagram of a data processing system in which the solution according to an embodiment of the invention is applicable.

With reference in particular to FIG. 1, a computer 100 (for example, consisting of a workstation) is illustrated. The computer 100 is formed by several units that are connected in parallel to a system bus 105. In detail, one or more microprocessors (IP) 110 control operation of the computer 100; a RAM 115 is directly used as a working memory by the microprocessor(s) 110, and a ROM 120 stores basic code for a bootstrap of the computer 100. Several peripheral units are clustered around a local bus 130 (by means of respective interfaces). Particularly, a mass memory consists of a hard-disk 135 and a drive 140 for reading CD-ROMs 145. Moreover, the computer 100 includes input units 150 (for example, a keyboard and a mouse), and output units 155 (for example, a monitor and a printer). An adapter 160 is used to connect the computer 100 to a network (not shown in the figure). A bridge unit 165 interfaces the system bus 105 with the local bus 130. Each microprocessor 110 and the bridge unit 165 can operate as master agents requesting an access to the system bus 105 for transmitting information. An arbiter 170 manages the granting of the access with mutual exclusion to the system bus 105.

Figure 2:
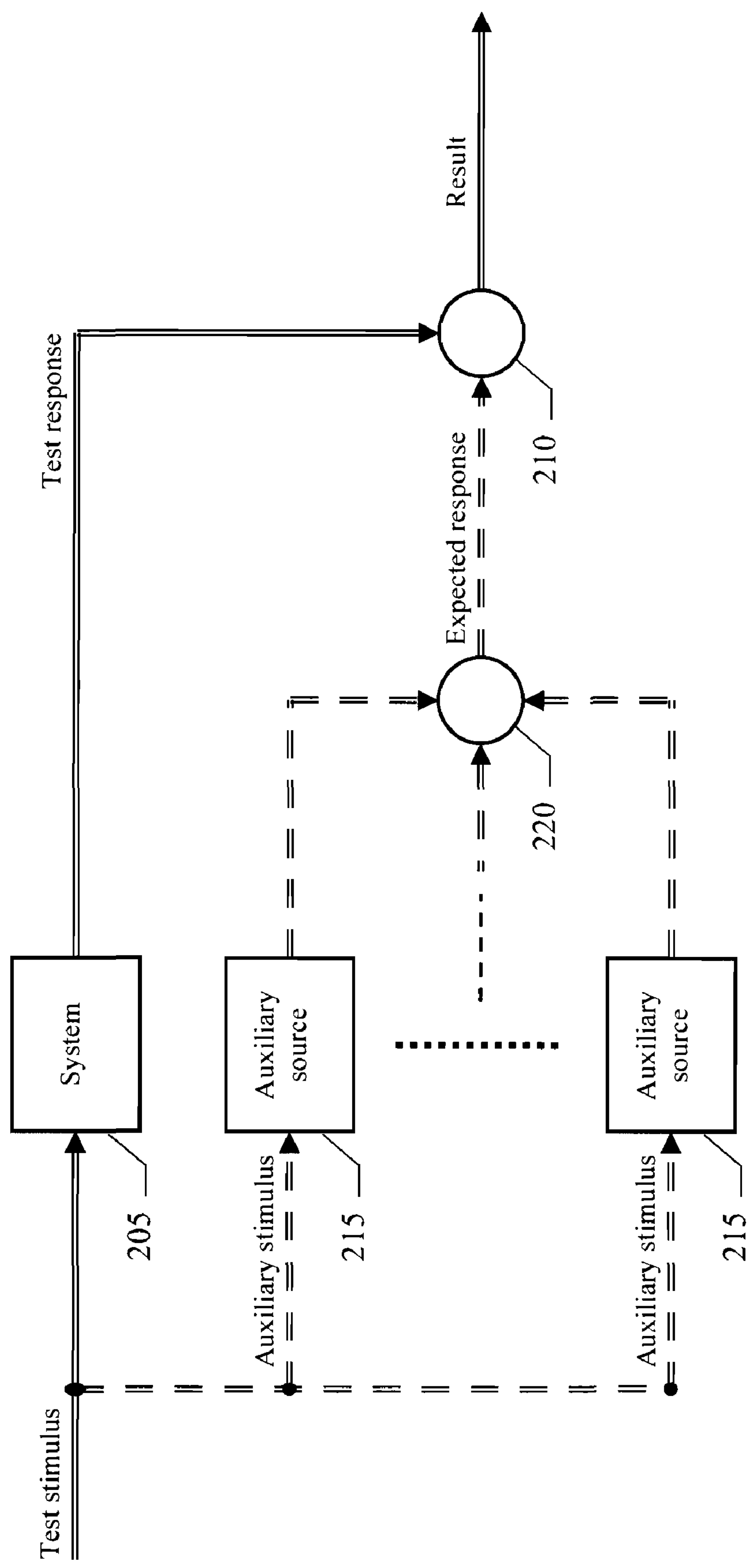
FIG. 2 illustrates an exemplary application of the solution according to an embodiment of the invention.

Considering now FIG. 2, the above-described computer is used to test a generic system 205 (for example, consisting of a software application). The running of the test includes the execution of a series of test cases. Each test case involves the application of a predefined test stimulus to the system 205 (i.e., a test input to the software application). The system 205 generates a corresponding test response to this test stimulus (i.e., a test output of the same software application). A result of the test case is determined by comparing the (actual) test response of the system 205 with an expected response of the system 205 to this test input (node 210); the expected response is the one that is deemed correct according to the desired behavior of the system 205. The test case is set to passed when the test response matches the expected response (i.e., they are the same); otherwise, when the test response differs from the expected response, the test case is set to failed.

In the solution according to an embodiment of the present invention, as described in detail in the following, the expected response is determined automatically. For this purpose, multiple auxiliary sources 215 are exploited (such as other software applications different from the one under test). Each auxiliary source 215 receives a corresponding auxiliary stimulus. The auxiliary stimulus is derived from the test stimulus being applied to the system 205; this auxiliary stimulus is intended to cause the auxiliary source 215 to provide the same expected response as the system 205 (such as by converting the test input according to the syntax of the other software application). The expected response (for determining the result of the test case) is then estimated according to the auxiliary responses collected from the auxiliary sources 215 (node 220)—for example, by setting it to the most frequent value thereof.

The proposed solution avoids (or at least reduces) any participation of a tester in the definition of the test cases. This limits the manual tasks in the design of the tests. Therefore, the human intervention being required is strongly reduced; particularly, this minifies any investigation activities on the part of the tester.

These advantages are clearly perceived in large software applications, and especially when they must be tested with a high level of accuracy (even if any other application of the proposed solution is contemplated). Moreover, the same advantages are magnified in very dynamic environments (wherein new versions, releases or service levels of the software applications are repeatedly provided).

The above-described solution reduces the time required to design and execute the tests. Moreover, the obtained results are more reliable (since their dependence on the skill of the tester is substantially reduced).

All of the above has a beneficial impact on the cost and the quality of the tests; this fosters their extensive application, with a positive repercussion on the reliability of the software applications.

Figure 3:
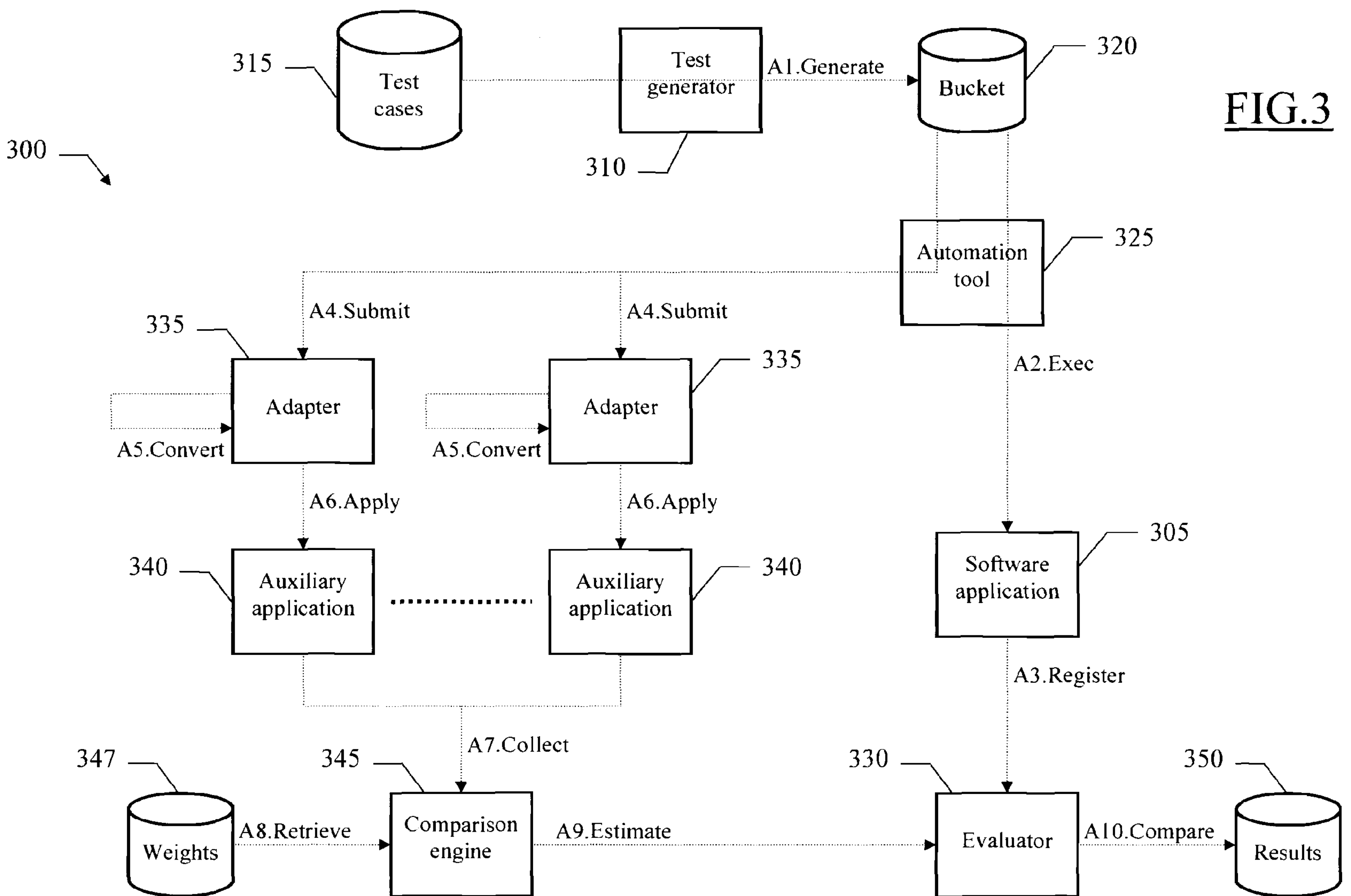
FIG. 3 is a collaboration diagram representing the roles of different software components that may be used to implement the solution according to an embodiment of the invention.
Figure 4A:
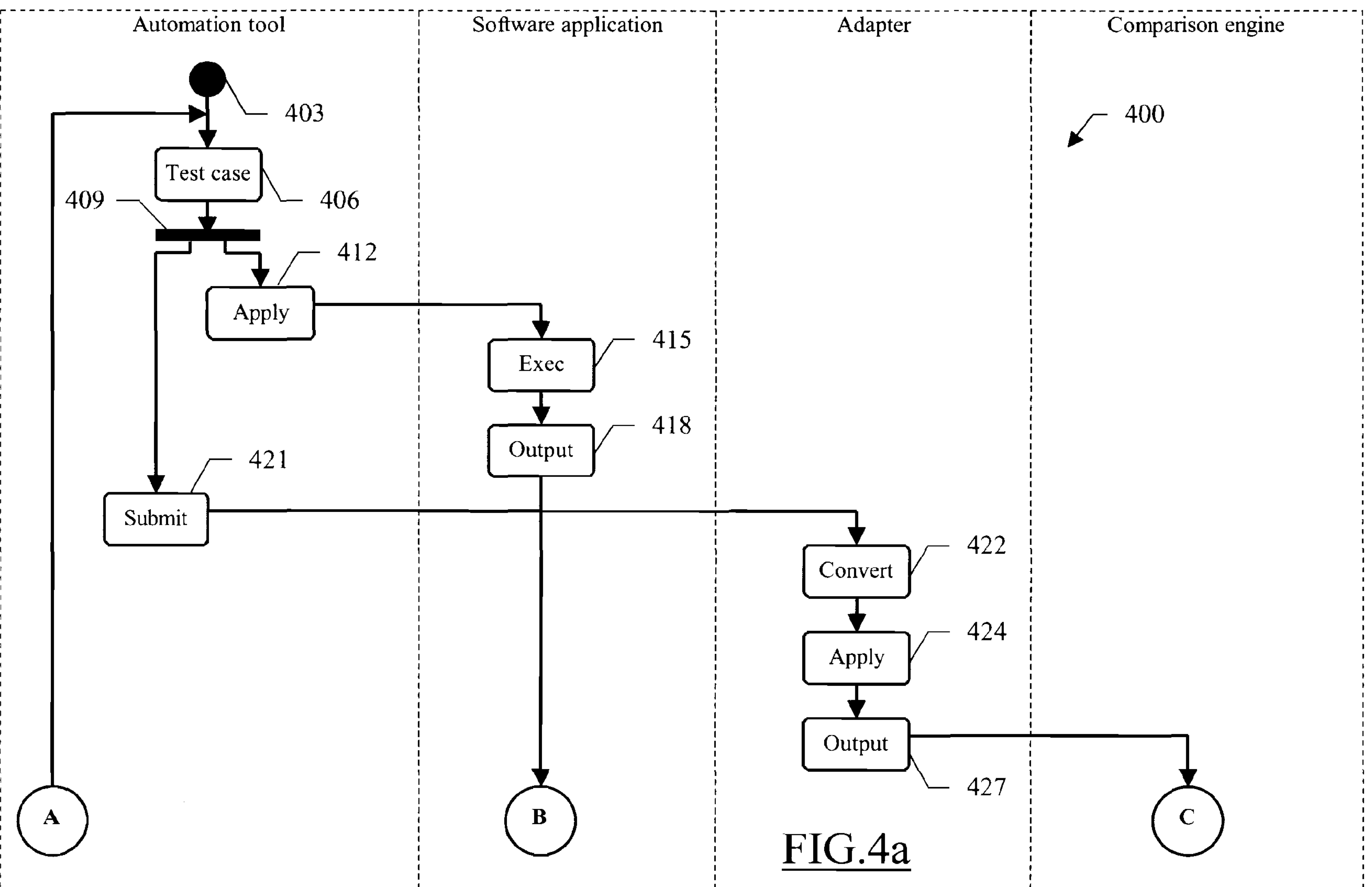
FIGS. 4*a*-4*d* show a diagram describing the flow of activities relating to an implementation of the solution according to an embodiment of the invention.
Figure 4B:
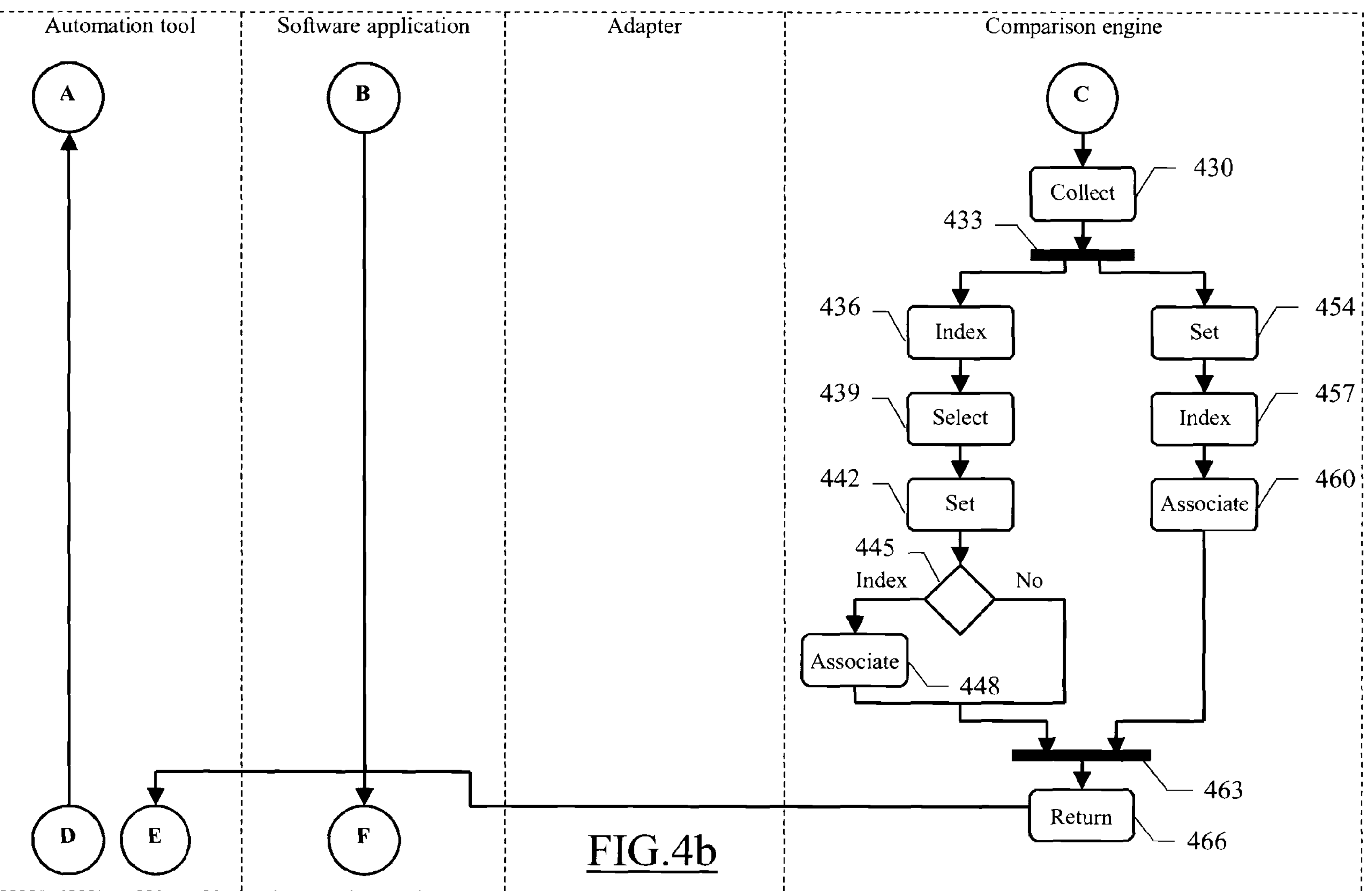
Figure 4C:
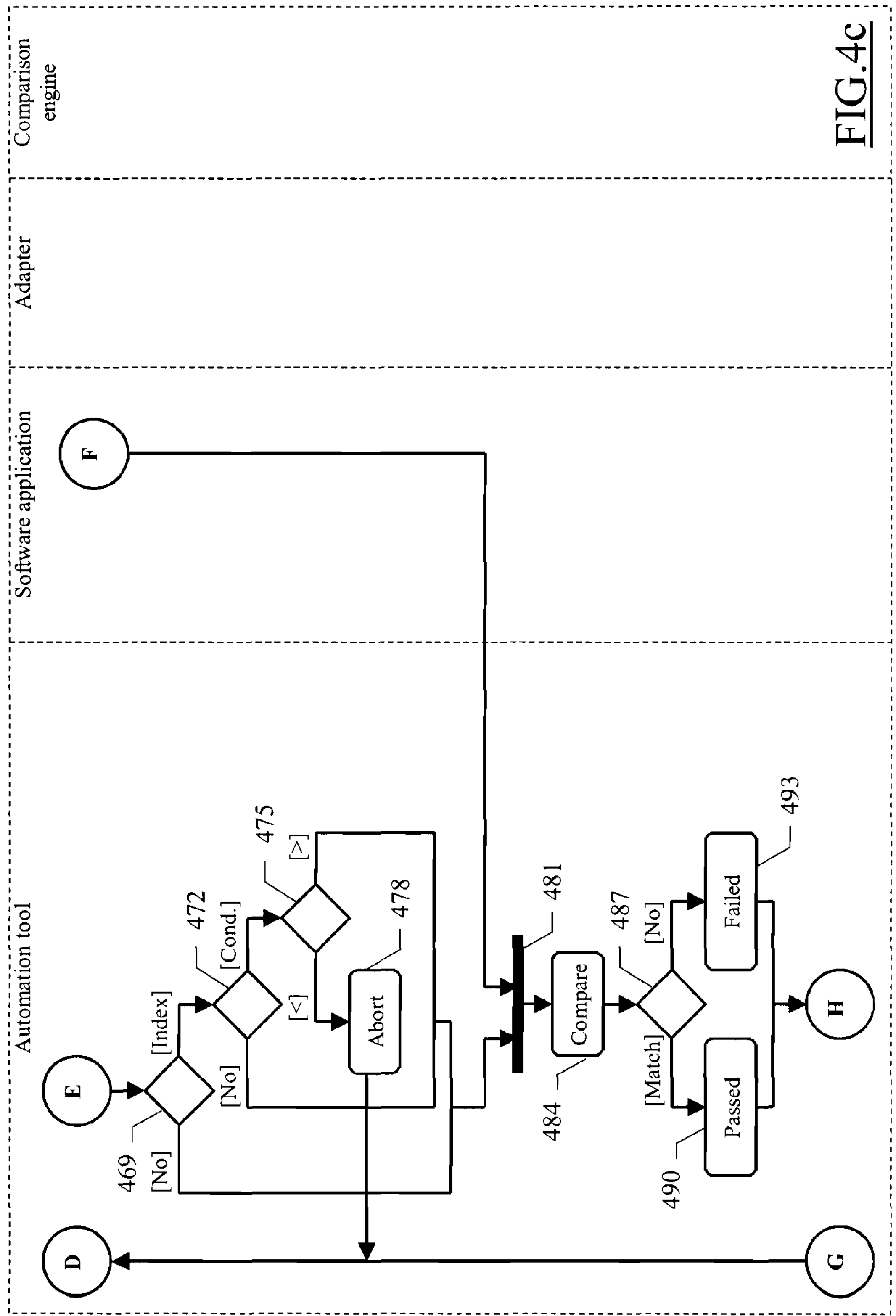
Figure 4D:
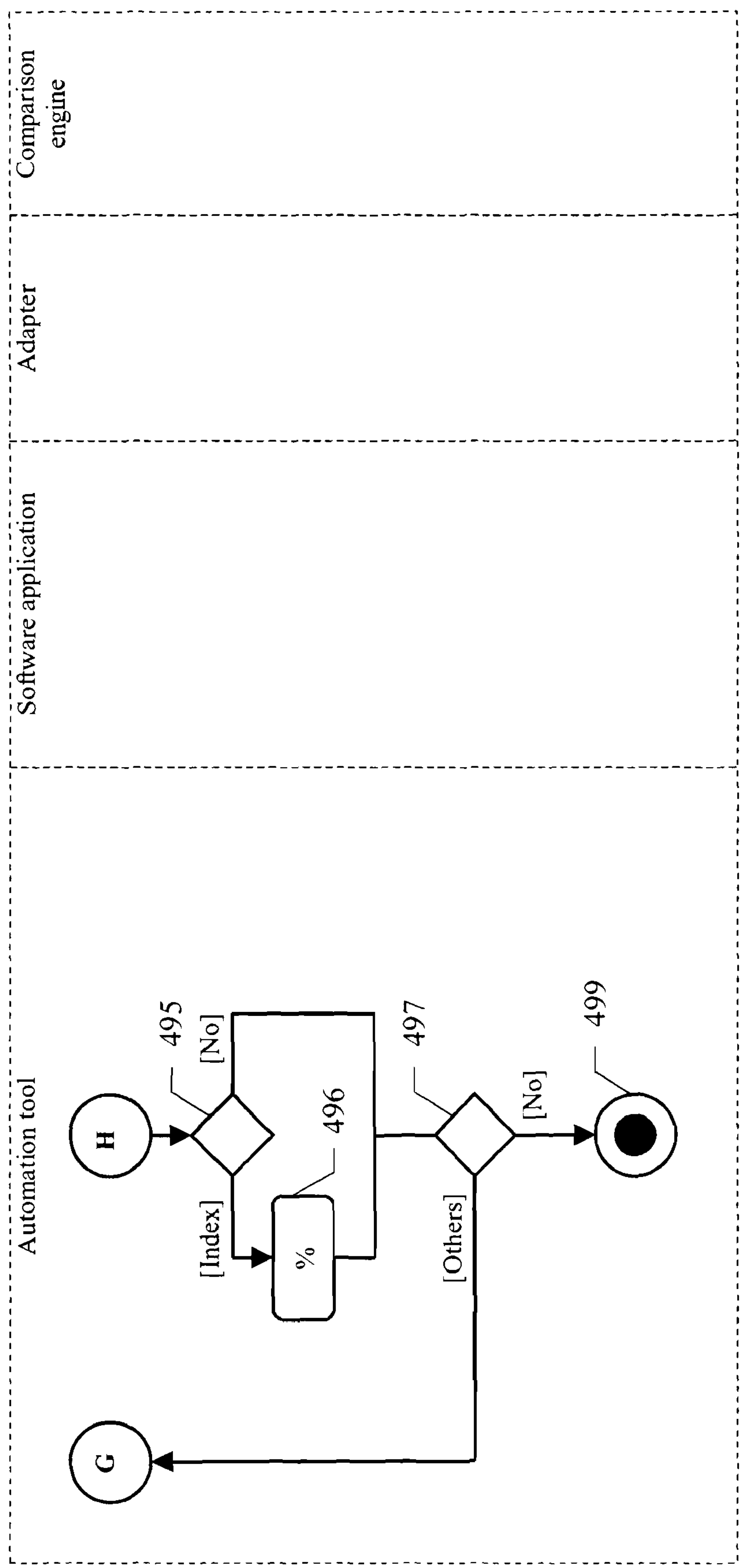

With reference now FIG. 3, the main software modules that run on the above-described computer are denoted as a whole with the reference 300. The information (programs and data) is typically stored on the hard-disk and loaded (at least partially) into the working memory of the computer when the programs are running. The programs are initially installed onto the hard-disk, for example, from CD-ROMs. Particularly, the figure describes the static structure of the system (by means of the corresponding modules) and its dynamic behavior (by means of a series of exchanged messages, each one representing a corresponding action, denoted with sequence numbers preceded by the symbol "A").

Particularly, the figure illustrates a test infrastructure that is used to verify the correctness of a software application 305. More in detail, the test infrastructure includes a test generator 310. The test generator 310 accesses a repository 315, which stores a series of test cases defining a coverage of the desired test on the software application 305; generally, the test cases are organized in groups, each one for a test scenario relating to operation of a different feature of the software application 305. Each test case specifies a test input to be applied to the software application 305 (for example, data and/or commands with possible arguments). The test generator 310 creates an execution bucket for the test cases of a selected test scenario (extracted from the repository 315); the bucket specifies the operations to be performed for running the selected test scenario, i.e., executing the corresponding test cases, in a machine-readable language (such as XML-based). The bucket so obtained is saved into a file 320 (action "A1.Generate").

An automation tool 325 (for example, consisting of the STAF/STAX—formed by the STAX execution engine running on top of the STAF framework) controls the execution of the bucket extracted from the file 320 (action "A2.Exec"). For each test case, this involves the application of the respective test input to the software application 305. In response thereto, the software application 305 generates a corresponding test output (for example, data, messages and/or return codes); the test outputs so obtained are registered by an evaluator 330 (action "A3.Register").

At the same time or beforehand, the test input of each test case is also submitted to a plurality of adapters 335 (action "A4.Submit"). Each adapter 335 interfaces with a corresponding auxiliary application 340 (for providing an auxiliary output corresponding to the expected output of the software application 305 in response to the test input). Preferably, the auxiliary applications 340 are independent of the software application 305. In this way, it is possible to ensure that the collected auxiliary outputs are not correlated to the test output of the software application 305; as a result, the accuracy of the expected output being estimated on their basis is strongly increased.

For example, let us assume that the software application 305 consists of an asset management application; a generic test case involves the determination of a hardware configuration of a specific machine. In this case, the auxiliary applications 340 may be a hardware management console of the machine, a hardware scanner, a program for querying a maintenance database, and the like. Another example is a software application 305 that must discover an Internet Address (IP) of a machine; in this case, the auxiliary applications 340 may be a Domain Name Server (DNS), a tool for reading a configuration file of the machine, or an Operating System thereof for accessing a corresponding configuration file being set dynamically, and the like.

Each adapter 335 generates an auxiliary input for the associated auxiliary application 340; this operation is performed by converting the test input according to the syntax of the auxiliary application 340 (action "A5.Convert"). For example, let us assume that the test input involves the reading of a value selected by two arguments Arg1 and Arg2; the corresponding command to be applied to the software application 305 is defined by the keyword "Read" with the required arguments in round brackets and separated by a comma:

Read(Arg1,Arg2).

Conversely, the syntax of the same command for a generic auxiliary application 340 may be defined by the keyword "Get" with the same arguments in square brackets and separated by a semicolon:

Get[Arg1;Arg2].

The adapter 335 then applies the auxiliary input so obtained to the corresponding auxiliary application 340 (action "A6.Apply).

Each auxiliary application 340 generates an auxiliary output (i.e., data, messages and/or return codes) in response to the corresponding auxiliary input; the auxiliary outputs provided by all the auxiliary applications 340 are collected by a comparison engine 345 (action "A7.Collect"). The comparison engine 345 estimates the expected response of the software application 305 to the test input according to the auxiliary outputs provided by the auxiliary applications 335 (such as according to the frequencies of their different values). For this purpose, the comparison engine 345 may also exploit predefined weights of the auxiliary applications 340, which are retrieved from a corresponding table (action "A8.Retrieve"); as described in detail in the following, each weight is indicative of a reliability of the corresponding auxiliary application 340.

The expected output so obtained is registered by the evaluator 330 as well (action "A9.Estimate"). The evaluator 330 determines the result of each test case by comparing its test output (from the software application 305) with the corresponding expected output (from the comparison engine 345). The result of the test case (for example, passed when the two values match and failed otherwise) is stored into a file 350 (action "A10.Compare").

Moving now to FIG. 4*a*-4*d*, the logic flow of an exemplary process that can be implemented to test a generic software application is represented with a method 400. The method begins at the start block 403 in the swim-lane of the automation tool when a bucket is selected (for running the corresponding test scenario on the software application). In response thereto, a loop is performed for each test case of the bucket starting from block 406. The flow of activities then forks at the synchronization bar 409 into two branches that are executed concurrently. A first branch consists of blocks 412-418, and a second branch consists of blocks 421-478; the two branches joint at the further synchronization bar 481.

Considering now block 412, the test input of the (current) test case is applied to the software application. This causes the software application to execute a desired operation at block 415. Passing to block 418, the software application returns a corresponding test output in response thereto. The branch then ends at the synchronization bar 481.

At the same time, the automation tool at block 421 submits the same test input to all the available adapters. Each adapter (only one shown in the figure for the sake of simplicity) at block 422 converts the test input into a corresponding auxiliary input for the associated auxiliary application. Continuing to block 424, the auxiliary input so obtained is now applied to the auxiliary application. The auxiliary application at block 427 returns a corresponding auxiliary output in response thereto.

The comparison engine collects the auxiliary outputs from all the auxiliary applications at block 430. The flow of activities then forks at the synchronization bar 433 into two branches that are executed alternatively according to the configuration of the comparison engine. A first branch consists of blocks 436-448, and a second branch consists of blocks 454-460; the two branches joint at the further synchronization bar 463.

In an embodiment of the invention (blocks 436-448), the weight of each auxiliary source (indicating its reliability) is retrieved at block 436 from the respective table. For example, the weight ranges from 0—when the auxiliary application is untrustworthy—to 1—when the auxiliary application is trustworthy. Referring again to the case of the asset management application (for determining the hardware configuration of a machine), the hardware management console of the machine is very reliable (and then has a high weight, such as 0.90-0.97); the hardware scanner and the program for querying the maintenance database have decreasing reliability (with lower and lower weights, such as 0.80-0.85 and 0.50-0.60, respectively). Likewise, in the case of the software application for discovering the IP of a machine, the DNS is the most reliable auxiliary application (with the highest weight, such as 0.96-0.98); the tool for reading the configuration file of the machine and the Operating System thereof for accessing the corresponding configuration file are less and less reliable (and then with lower weights, such as 0.70-0.80 and 0.60-0.70, respectively).

The auxiliary outputs provided by all the auxiliary applications are then classified according to their values. For this purpose, a confidence index is calculated for each value of the auxiliary outputs. Preferably, the confidence index of each value is set to the sum of the weights of the auxiliary applications that provided it, divided by sum of the weights of all the available auxiliary applications. In this way, the confidence index indicates the probability that the corresponding value represents the (correct) expected output of the test case (from 0—when the value is substantially impossible—to 1—when the value is practically certain). Preferably, as set out above, the confidence index of each value is based on both the frequency of the value (i.e., the number of auxiliary applications providing it) and their reliability (as defined by the corresponding weights); more specifically, the higher the frequency and the reliability, the higher the confidence index. As a result, it is possible to discriminate the auxiliary outputs provided by different auxiliary applications.

The method then continues to block 439, wherein the value of the auxiliary outputs with the highest confidence index is selected. The expected output of the test case is then set at block 442 to the selected value. This choice provides good results in a very simple way.

With reference to block 445, the method branches according to a further configuration of the comparison engine. Particularly, if the test environment has been set to take into account the confidence indexes for evaluating the result of the test, the confidence index of the selected value is associated with the expected output so obtained at block 448. The branch then ends at the synchronization bar 463; the same point is also reached from block 445 directly otherwise (when the confidence indexes are not used any longer).

In another embodiment of the invention (blocks 454-460), the expected output of the test case is set at block 454 to a selected auxiliary output of a predefined auxiliary application (hereinafter referred to as main auxiliary application). The main auxiliary application consists of the one that is deemed the most reliable. With reference to the above-mentioned examples, the main auxiliary application for the asset management application is the hardware management console of the machine, whereas the main auxiliary application for the software application intended to discover the IP of a machine is the DNS. In this way, it is possible to ensure that the expected output is always provided by the most trusted auxiliary application.

Proceeding to block 457, the weight of each other auxiliary application (different from the main auxiliary application) is retrieved from the respective table. A confidence index of the selected auxiliary output is then calculated. The confidence index is set to the complement to 1 of a value, which is equal to the sum of the weights of the other auxiliary applications—that provided an auxiliary output different from the one of the main auxiliary application—divided by the sum of the weights of all the other auxiliary applications. In this way, the confidence index provides an indication of the probability that the selected auxiliary output is equal to the correct expected output of the test case (from 0—when its value is substantially impossible—to 1—when it is practically certain). Preferably, this result is again based on both the frequency of the different auxiliary outputs and their reliability; more specifically, the higher the frequency and the reliability of the other auxiliary applications that provided the different auxiliary output the lower the confidence index. The method continues to block 460, wherein the confidence index so obtained is associated with the expected output of the test case. The branch then ends at the synchronization bar 463.

In both cases, the flow of activities continues from the synchronization bar 463 to block 466; in this phase, the comparison engine returns the expected output (possibly including its confidence index) to the automation tool. In response thereto, the method branches at block 469 according to the type of the returned information. If the expected output includes the confidence index, the flow of activities differentiates at block 472 according to the configuration of the automation tool. If the automation tool has been set to condition the result of the test case on the confidence index of the expected output, a test is performed at block 475. When the confidence index does not reach a predefined threshold (such as 0.7-0.8), the process passes to block 478. As a result, the test case is aborted and the method returns to block 406 directly (to process a next test case); in this way, it is possible to invalidate (and then discard) any results of the test that might be not significant. The method now passes to the synchronization block 481; the same point is also reached from block 469 (when the expected output does not include the confidence index), from block 472 (when the result of the test case is not conditioned on the confidence index) or from block 475 (when the confidence index exceeds the desired threshold).

The flow of activities continues from the synchronization bar 481 to block 484, wherein the test output is compared with the expected output so obtained. The method then branches at block 487 according to the result of the comparison. Particularly, it the two values match the test case is set to passed at block 490; conversely (i.e., when the test output differs from the expected output), the test case is set to failed a block 493. In both cases, two different execution paths are followed from block 495 according to the configuration of the automation tool. Particularly, if the automation tool is set to take into account the confidence index of the expected output, this value is associated with the result of the test case at block 496; in this way, it is possible to determine a probability of the result of the test case. The flow of activities then descends into block 497; the same point is also reached from block 495 directly otherwise (when the confidence index is not available or is not used).

A test is now made at block 497 to determine whether further test cases are still to be executed. If so, the process returns to block 409 to reiterate the same operations described above. Conversely, the method ends at the concentric white/block stop circles 499.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply to tests of different type—for example, including any number of test cases or more generally involving the execution of equivalent operations; for example, the test may be run on Command Line Interfaces (CLIs), on Graphical User Interfaces (GUIs), on distributed applications (such as of the web type), and so on. Each bucket may also be generated in a different language for use by any other automation tool; anyway, nothing prevents running the test in a manual way. Moreover, it is possible to determine the result of each test case with more complex rules; for example, the expected output may consist of a range of values (with the test case that is deemed passed when the test output is included in this range).

Of course, the proposed auxiliary applications (for estimating the expected output) are not comprehensive, and they may be replaced with any other number of sources of the required information. Similar considerations apply when different rules are used to derive the auxiliary inputs (for the different auxiliary applications) from the test input of the software application under test.

It should be noted that the expected outputs may also be estimated before running the test (thereby increasing the execution speed of the test cases, but with the risk of using expected values that are not up-to-date). For example, this may be achieved—for each test case—by collecting the auxiliary outputs, determining the expected output and then updating the definition of the test case accordingly; in this way, the test may be run later on as usual (even in a standard test environment).

Although in the preceding description great emphasis has been given to the test of software applications, this is not to be interpreted in a limitative manner; more generally, the proposed technique may be used to test operating systems, telecommunication architectures, computers, electronic devices, or any other systems. Accordingly, the inputs and outputs may be replaced by equivalent stimuli and responses, respectively (such as interrupts, remote invocations, physical actions, electrical signals, and the like).

The use of auxiliary applications in some way correlated with the software application under test is not excluded; for example, it is possible to take into account the test output of a previous execution of the same test case as well (in addition to other auxiliary applications providing the same information).

In a different embodiment of the invention, the confidence index assigned to each value of the auxiliary outputs may be calculated in a different way (for example, by applying formulas depending non-linearly on the weights); moreover, the weights may also be defined dynamically (for example, according to historic information).

Conversely, a simplified implementation wherein the confidence indexes are simply set to the frequencies of the different values of the auxiliary outputs (without the definition of any weights) is within the scope of the invention.

In any case, more complex algorithms may be used to select the expected output (for example, based on statistical distributions, fuzzy logic techniques, and the like).

Alternatively, the main auxiliary application may be set dynamically (for example, to the one having the highest weight). As above, the confidence index of the auxiliary output of the main auxiliary application may be calculated in a different way.

In this case as well, nothing prevents setting the confidence index simply to the frequency of the auxiliary outputs different from the one of the main auxiliary application.

Alternatively, it is possible to use the confidence index associated with the expected response in any other way (for example, for generating a warning when it falls below a safe threshold). Anyway, as pointed out above, the confidence index may only be used to define the expected output (with the result of the test case that is then always set to passed or failed as usual, without any indication of its probability).

Naturally, the above described threshold value (for invalidating the result of the test) is merely illustrative; moreover, this feature is not strictly necessary and it may be omitted in some implementations of the invention.

It is emphasized that the above-described embodiments of the invention are not exhaustive. In other words, any other algorithm may be used for estimating the expected response of any test case based on the corresponding auxiliary responses provided by the available auxiliary sources.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Alternatively, the proposed method may be carried out on a computer having a different architecture or including equivalent units (such as cache memories temporarily storing the programs or parts thereof to reduce the accesses to the mass memory during execution); likewise, the same solution may also be applied to a central server (for testing multiple clients), to a network of computers (for testing a co-operative environment), and the like. More generally, it is possible to replace the computer with any code execution entity (such as a PDA, a mobile phone, and the like), or with a combination thereof (such as a client/server architecture, a grid computing infrastructure, and the like).

The invention claimed is:

1. A method for testing a system, the method comprising:

applying a test input to the system, the test input being intended to cause the system to provide an expected response;

detecting a test response of the system, the test response consisting of an actual response of the system to the test input;

determining a result of the test according to a comparison between the test response and the expected response;

applying a corresponding auxiliary input derived from the test input to each one of a plurality of auxiliary sources, the auxiliary input being intended to cause the auxiliary source to provide said expected response;

detecting an auxiliary response of each auxiliary source, the auxiliary response consisting of an actual response of the auxiliary source to the corresponding auxiliary input; and estimating the expected response according to the auxiliary responses.

2. The method according to claim 1, wherein the system is a software application and wherein each auxiliary source is an auxiliary software application.

3. The method according to claim 2, wherein at least one of the auxiliary sources is independent of the system.

4. The method according to claim 2, wherein estimating the expected response comprises:

calculating a confidence index of each different value of the auxiliary responses, the confidence index being based on a frequency of the value in the auxiliary responses;

selecting one of the values of the auxiliary responses according to the confidence indexes; and setting the expected response to the selected value.

5. The method according to claim 4, wherein calculating the confidence index of each value of the auxiliary responses comprises:

setting the confidence index according to a predefined weight of each auxiliary source providing the value.

6. The method according to claim 4, wherein selecting one of the values of the auxiliary responses comprises:

selecting the value having the confidence index indicative of the highest confidence.

7. The method according to claim 4, wherein estimating the expected response further comprises:

associating the confidence index of the selected value with the expected response.

8. The method according to claim 7, wherein determining the result of the test comprises:

associating the confidence index of the expected response with the result of the test.

9. The method according to claim 7, wherein determining the result of the test further comprises:

invalidating the result of the test when the confidence index of the expected response does not reach a predefined threshold.

10. The method according to claim 1, wherein estimating the expected response comprises:

setting the expected response to a selected auxiliary response of a predefined main one of the auxiliary sources;

calculating a confidence index of the selected auxiliary response, the confidence index being based on a frequency of the auxiliary responses of the other auxiliary sources being different from the selected auxiliary response; and associating the confidence index of the selected auxiliary response with the expected response.

11. The method according to claim 10, wherein calculating the confidence index of the selected auxiliary response comprises:

setting the confidence index according to a predefined weight of each other auxiliary source providing an auxiliary response different from the selected auxiliary response.

12. A computer program product comprising a non-transitory computer useable storage medium having a computer readable program stored thereon, wherein the computer readable program, when executed on a computing device, causes the computing device to:

apply a test input to a system, the test input being intended to cause the system to provide an expected response;

detect a test response of the system, the test response consisting of an actual response of the system to the test input;

determine a result of the test according to a comparison between the test response and the expected response;

apply a corresponding auxiliary input derived from the test input to each one of a plurality of auxiliary sources, the auxiliary input being intended to cause the auxiliary source to provide said expected response;

detect an auxiliary response of each auxiliary source, the auxiliary response consisting of an actual response of the auxiliary source to the corresponding auxiliary input; and estimate the expected response according to the auxiliary responses.

13. The computer program product according to claim 12, wherein the system is a software application and wherein each auxiliary source is an auxiliary software application.

14. The computer program product according to claim 13, wherein at least one of the auxiliary sources is independent of the system.

15. The computer program product according to claim 12, wherein the computer readable program causes the computing device to estimate the expected response by:

calculating a confidence index of each different value of the auxiliary responses, the confidence index being based on a frequency of the value in the auxiliary responses;

selecting one of the values of the auxiliary responses according to the confidence indexes; and setting the expected response to the selected value.

16. The computer program product according to claim 15, wherein the computer readable program causes the computing device to calculate the confidence index of each value of the auxiliary responses by:

setting the confidence index according to a predefined weight of each auxiliary source providing the value.

17. The computer program product according to claim 15, wherein the computer readable program causes the computing device to select one of the values of the auxiliary responses by:

selecting the value having the confidence index indicative of the highest confidence.

18. The computer program product according to claim 15, wherein the computer readable program causes the computing device to estimate the expected response by:

associating the confidence index of the selected value with the expected response.

19. The computer program product according to claim 12, wherein the computer readable program causes the computing device to estimate the expected response by:

setting the expected response to a selected auxiliary response of a predefined main one of the auxiliary sources;

calculating a confidence index of the selected auxiliary response, the confidence index being based on a frequency of the auxiliary responses of the other auxiliary sources being different from the selected auxiliary response; and associating the confidence index of the selected auxiliary response with the expected response.

20. An apparatus, comprising:

a processor; and a memory coupled to the processor, wherein the memory comprises instructions which, when executed by the processor, cause the processor to:

apply a test input to a system, the test input being intended to cause the system to provide an expected response;

detect a test response of the system, the test response consisting of an actual response of the system to the test input;

determine a result of the test according to a comparison between the test response and the expected response;

apply a corresponding auxiliary input derived from the test input to each one of a plurality of auxiliary sources, the auxiliary input being intended to cause the auxiliary source to provide said expected response;

detect an auxiliary response of each auxiliary source, the auxiliary response consisting of an actual response of the auxiliary source to the corresponding auxiliary input; and estimate the expected response according to the auxiliary responses.

* * * * *